United States Patent
Van Lieu et al.

(10) Patent No.: US 9,511,869 B2
(45) Date of Patent: Dec. 6, 2016

(54) MIXER AND AIR PACK FOR USE IN AIRCRAFT AIR SUPPLY SYSTEM

(71) Applicant: Hamilton Sundstrand Corporation, Windsor Locks, CT (US)

(72) Inventors: Pieter Van Lieu, Westfield, MA (US); Mark Vignali, Northfield, CT (US); Calvin R. Parent, Enfield, CT (US); Brent J. Merritt, Southwick, MA (US); Gary T. Luedtke, Tolland, CT (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 974 days.

(21) Appl. No.: 13/723,398

(22) Filed: Dec. 21, 2012

(65) Prior Publication Data

US 2014/0245775 A1    Sep. 4, 2014

(51) Int. Cl.
  *B64D 13/08* (2006.01)
  *B64D 13/06* (2006.01)

(52) U.S. Cl.
  CPC ............... *B64D 13/08* (2013.01); *B64D 13/06* (2013.01); *B64D 2013/0688* (2013.01)

(58) Field of Classification Search
  CPC ......... B64D 13/04; B64D 13/00; B64D 13/06; B64D 13/02; B64D 2013/0688; Y02T 50/56
  USPC ................................ 454/71, 73, 76; 366/135
  See application file for complete search history.

(56) References Cited

U.S. PATENT DOCUMENTS

| | | | | |
|---|---|---|---|---|
| 4,399,665 | A | * | 8/1983 | Evans .................... B64D 13/08 244/118.5 |
| 4,799,631 | A | * | 1/1989 | Humphries ............ B64D 11/00 105/337 |
| 5,118,053 | A | | 6/1992 | Singh et al. |
| 5,516,330 | A | | 5/1996 | Dechow et al. |
| 5,695,396 | A | | 12/1997 | Markwart et al. |
| 5,890,957 | A | | 4/1999 | Scherer et al. |
| 6,257,003 | B1 | | 7/2001 | Hipsky |
| 6,299,525 | B1 | | 10/2001 | Scheffler et al. |
| 6,921,047 | B2 | * | 7/2005 | McColgan ............. B64D 13/00 236/13 |
| 6,942,183 | B2 | | 9/2005 | Zywiak |
| 7,322,202 | B2 | | 1/2008 | Zywiak et al. |
| 7,779,644 | B2 | | 8/2010 | Decrisantis et al. |
| 7,784,773 | B1 | * | 8/2010 | Sanetick ............... F16F 1/3935 244/17.11 |

* cited by examiner

*Primary Examiner* — Gregory Huson
*Assistant Examiner* — Dana Tighe
(74) *Attorney, Agent, or Firm* — Carlson, Gaskey & Olds, PC

(57) ABSTRACT

A mixer has an internal bore with an inlet to a chamber, and an outlet at an opposed end/A duct is connected to receive a recirculated air flow. The duct communicates air into the chamber through recirculating air ports such that the recirculating air can mix with the air from the inlet. The mixer housing has a cockpit outlet for delivering air to a second outlet, with the cockpit output being located axially upstream from the recirculating air ports. An isolator is mounted at an outer periphery of the mixer housing, and has flat sides on each of two circumferentially spaced sides. A belly band is bolted to an outer periphery of the mixer housing and to flat sides of the isolator.

17 Claims, 5 Drawing Sheets

MIXER AND AIR PACK FOR USE IN AIRCRAFT AIR SUPPLY SYSTEM

BACKGROUND OF THE INVENTION

This application relates to a mixer utilized to mix plural air flow sources and supply the air to various uses on an aircraft.

Aircraft require conditioned air flow for any number of purposes. As one example, air must be supplied into a passenger cabin.

Complex machines, known as air cycle machines, take in ambient air and condition that air such that it may be utilized in a passenger cabin. In addition, it is known to recirculate air from the cabin. The air flow from the air cycle machine is mixed with the recycled air in a so-called mixer.

Known mixers are mounted within a complex air supply pack that includes the air supply machine, ducts, and various conduits for moving air.

The known mixer is secured to a frame of the aircraft through a device called a belly band. The belly band supports a bottom of the mixer, and is attached to the mixer housing on a side of the mixer housing that also receives an isolator. The isolator provides a vibration damper to a connection to the frame of the aircraft.

In addition, posts are formed on an outer periphery of the mixer housing, and are utilized to attach conduits, valves, and other components.

In general, the attachments in the prior art may not always have been sufficiently robust.

SUMMARY OF THE INVENTION

A mixer has an internal bore with an inlet to a chamber, and an outlet at an opposed end. A duct is connected to receive a recirculated air flow. The duct communicates air into the chamber through recirculating air ports such that the recirculating air can mix with the air from the inlet. The mixer housing has a cockpit outlet for delivering air to a second outlet, with the cockpit output being located axially upstream from the recirculating air ports. An isolator is mounted at an outer periphery of the mixer housing, and has flat sides on each of two circumferentially spaced sides. A belly band is bolted to an outer periphery of the mixer housing and to flat sides of the isolator.

These and other features may be best understood from the following drawings and specification.

DETAILED DESCRIPTION

Figure 1A:
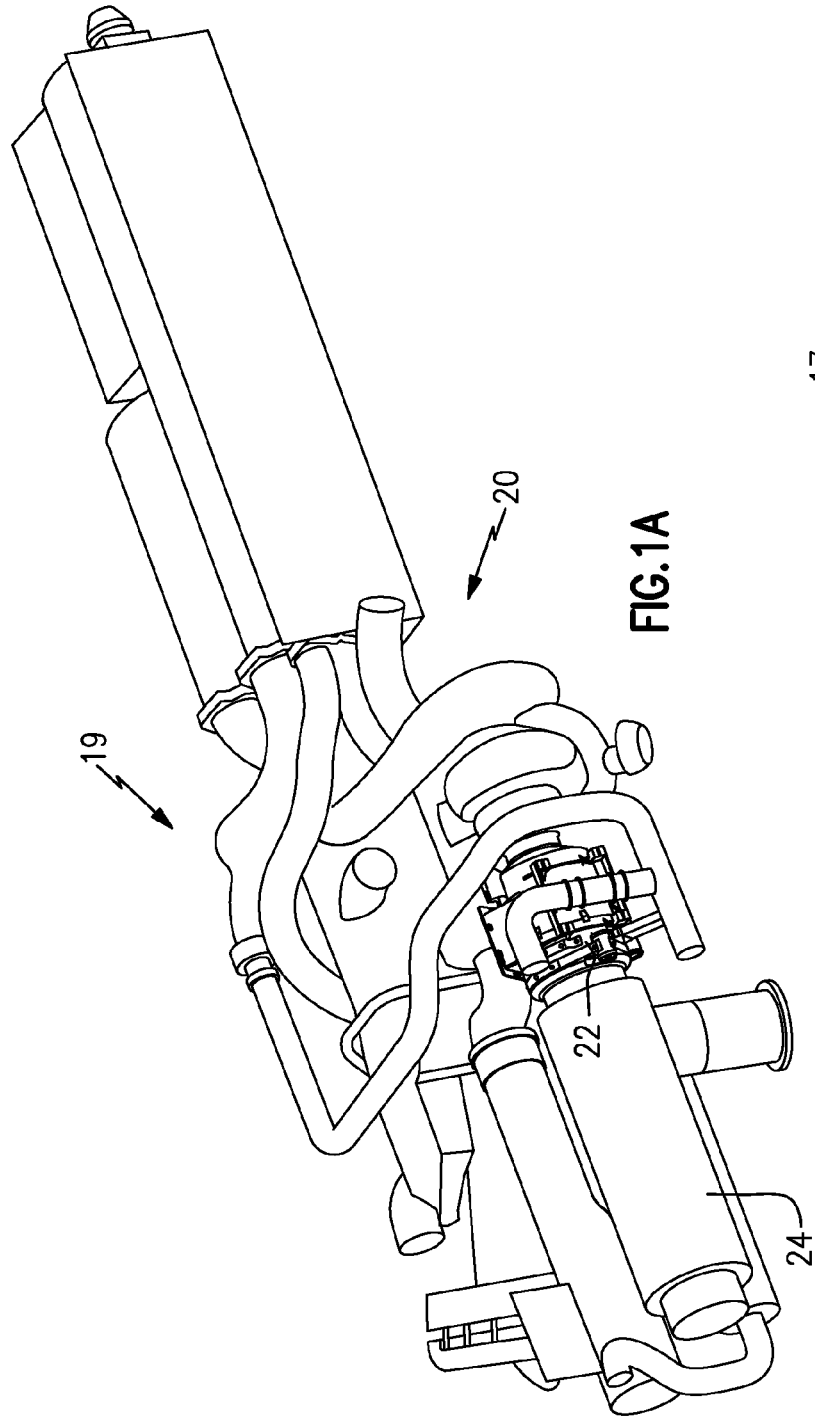
FIG. 1A schematically shows an air supply pack for use in an aircraft.

FIG. 1A shows an air supply pack 19 which may be utilized on an aircraft. An air cycle machine 20 takes in ambient air, and includes a refrigerant system to condition the ambient air. In general, the ambient air is heated to a temperature such that it can be circulated to a passenger cabin, and to the cockpit.

The air cycle machine typically includes a fan for delivering air to a mixer 22. The mixer 22 mixes plural sources of air, and passes it downstream into a cabin air supply duct 24.

Figure 1B:
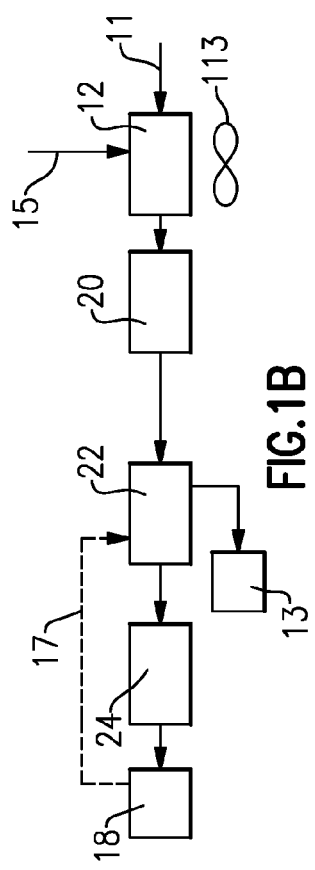
FIG. 1B is a schematic of air flow.

FIG. 1B schematically shows the duct 24 delivering air into a cabin 18. Recirculating air shown at 17 is also sent to the mixer 22. The air cycle machine 20 receives hot air 11, such as from a compressor of a gas turbine engine. Ambient air 15 is driven by a fan 113, and across a heat exchanger 12 for conditioning the air 11. Also, air flows from the mixer 22 to a cockpit 13.

Figure 2:
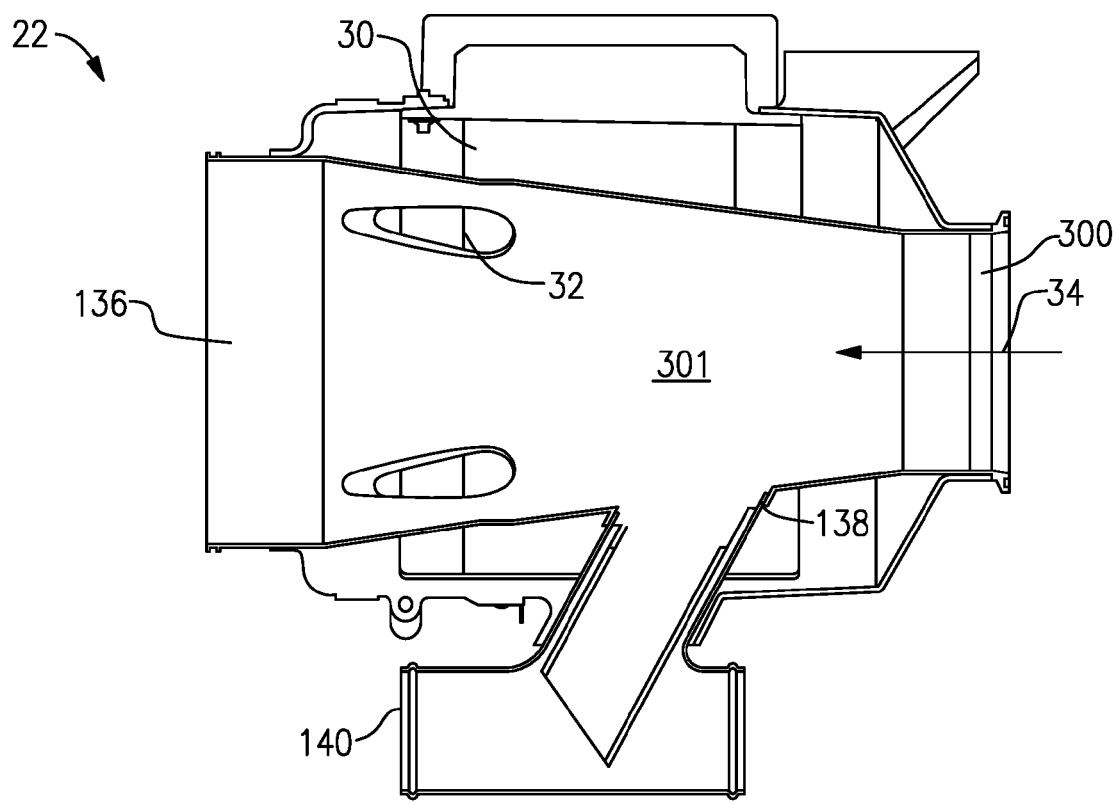
FIG. 2 is a cross-section through a mixer.

As shown in FIG. 2, the mixer 22 includes a duct 30 for receiving the recirculated air 17 from the cabin, and delivering air to the flight deck or cockpit 13 through an outlet 138 and a duct 140.

As can be appreciated from FIG. 2, the air 34, supplied to the mixer 22 from the air cycle machine 20, enters an inlet 300 to a chamber 301. Air from chamber 301 is diverted such that a portion of that air flows through the outlet 138 to the cockpit prior to the recirculation air being mixed into chamber 301 with the air from the air cycle machine. The recirculated air passes through ports 32 downstream of the opening 138. An outlet 136 is axially downstream of inlet 300, and leads to the ducts 24. Thus, both air 34 from the air cycle machine 20 and recirculated air 17 are mixed in mixer 22. On the other hand, the air delivered to the cockpit is only the air 34 from the air cycle machine.

Figure 3:
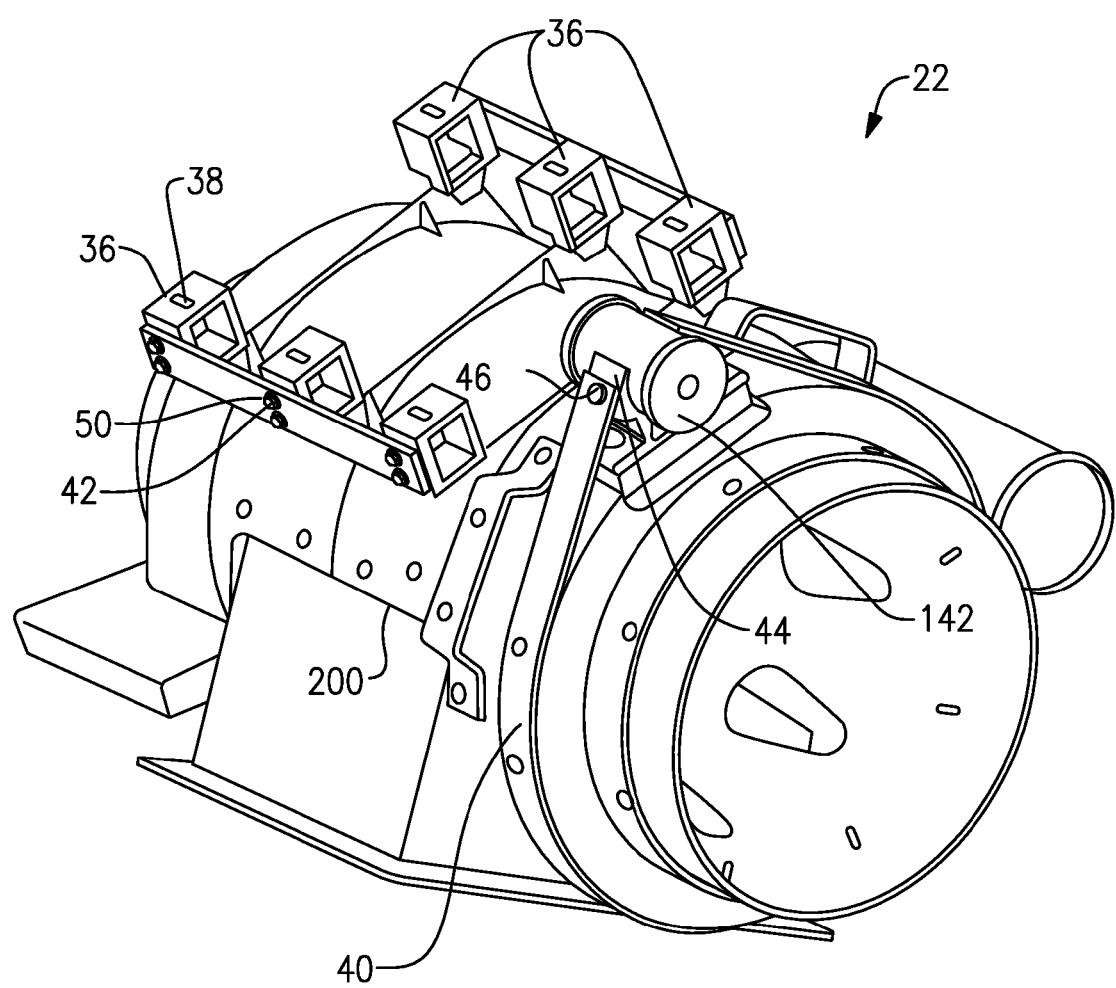
FIG. 3 is a perspective view of the mixer.

FIG. 3 show the mixer 22. An isolator 142 is utilized to provide a vibration damper connection to a frame on the aircraft.

Sides 44 of the isolator 142 are bolted at 46 to a belly band 40 that also is bolted around an outer circumference of a housing 200 of the mixer 22. In addition, a plurality of posts 36 are formed with slots 38, and are utilized to be mounted to ducts, valves, or othercomponents of the pack 19.

Brackets or reinforcing plates 50 are bolted at 42 to each of the three posts 36 on each side of the mixer 22. The reinforcing plates 50 provide a stronger connection, and share the load between the three posts 36. Attaching the belly band to the sides 44 of the isolator housing provides a more robust connection. In the past, the belly band has been attached to the housing on each circumferential side of the isolator, but to the outer periphery of the housing, and not to the isolator 142 itself.

Figure 4:
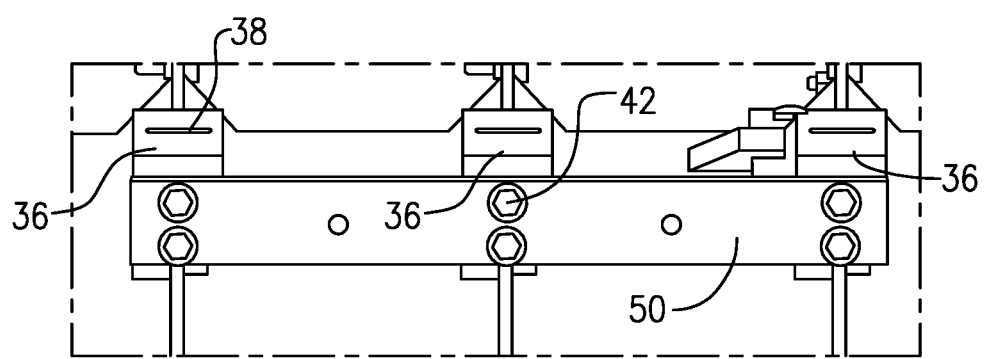
FIG. 4 is a side view of one feature.

FIG. 4 is a detail of the reinforcing plates 50 being bolted at 42 to the posts 36. Again, this provides better distribution of the load. Slots 38 are used to mount structure as mentioned.

Figure 5:
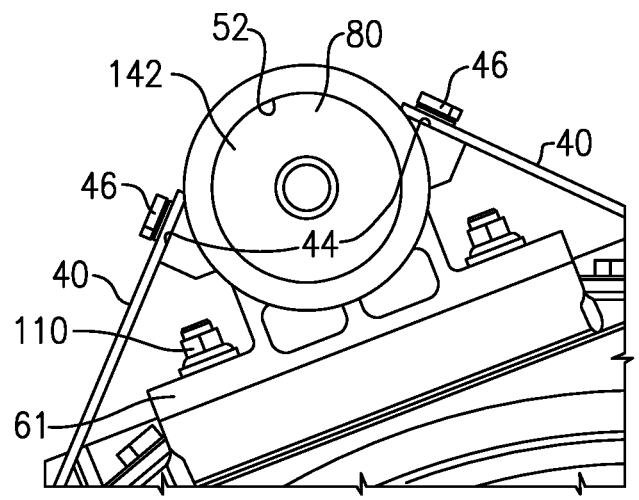
FIG. 5 is an enlarged view of another feature.

FIG. 5 shows the connection of the belly band 40 to the bolts 46 on the sides 44 of a housing for the isolator 142. As can be appreciated, the isolator 142 includes a damper member 80 received within a bore in an outer housing.

Figure 6:
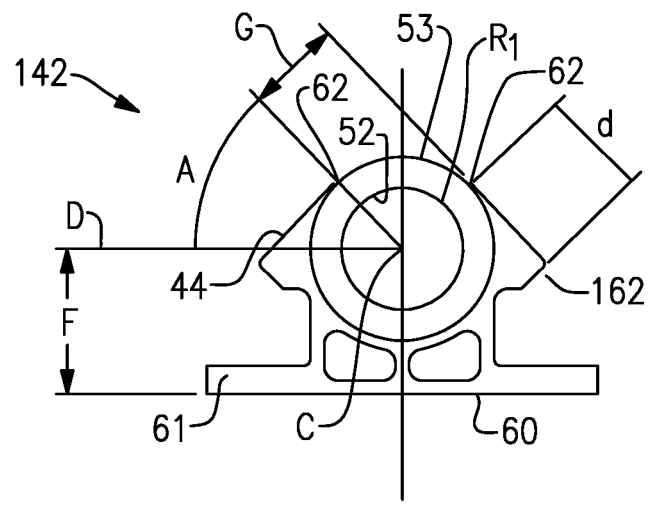
FIG. 6 shows an isolator.

FIG. 6 show the isolator 142. An inner bore 52 receives the damper member 80. The outer surfaces 44 are formed as angled, flat surfaces on each side of a circumferentially central cylindrical portion 53. A center line C can be defined, and a plane D through the center C is taken parallel to a bottom surface 60 of a plate 61, which is bolted to the mixer housing as shown at 110 in FIG. 5. An angle A and an offset G can be defined between the plane D and an end point 62 of the flat surface 44. In one embodiment, the angle A was 46.50 degrees and the offset 0.870 inches (2.21 centimeters). In embodiments, A may be between 46.00 and 47.00 degrees and the offset may be between 0.860 and 0.880 inches (2.18 and 2.23 centimeters).

A lower end point 162 of the flat surface 44 is spaced from the upper end points 62 by a distance d. A diameter $R_1$ can be defined between the center point C and the upper point 62, or at any other location along the cylindrical portion 53. In one embodiment, d was 1.050 inches (2.67 centimeter), $R_1$ was 0.870 inch (2.21 centimeters). In embodiments, a ratio of d to $R_1$ was between 1.180 and 1.233.

Additionally, a dimension F can be defined measured from the surface 60 to the centerpoint C, and extending perpendicularly to the surface 60. In one embodiment, the dimension F was 1.350 inches (3.43 centimeters).

In embodiments, a ratio of F measured in inches to the angle A measured in degrees was between 1.345/46.0 and 1.355/47.0 inches/degrees (3.41/46.0 and 3.44/47.0 centimeters/degrees). Further, a ratio of $R_1$ to angle A was between 0.860/46.0 and 0.880/47.0 inches/degrees (2.18/46.0 and 2.24/47.0 centimeters/degrees).

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A mixer for use in an aircraft air supply system comprising:
    a mixer housing having an internal bore with an inlet to a chamber, and an outlet at an opposed end, and a duct to be connected to receive a recirculated air flow, said duct communicating air into the chamber through recirculating air ports such that the recirculating air can mix with the air from the inlet, and said mixer housing having a cockpit outlet for delivering air to a second outlet, with said cockpit output being located axially upstream from said recirculating air ports;
    an isolator mounted at an outer periphery of said mixer housing, and said isolator having flat sides on each of two circumferentially spaced sides of said isolator;
    a belly band bolted to an outer periphery of said mixer housing, said belly band also being bolted to said flat sides of said isolator; and
    said isolator having a central bore receiving a vibration damper member.

2. The mixer as set forth in claim 1, wherein there being a plurality of posts in a row on each circumferential side of said isolator, and on the outer periphery of said mixer housing, and there being a reinforcing plate connected to each of said posts in each row on each of said circumferential side of said isolator.

3. The mixer as set forth in claim 1, wherein said isolator housing having an upper surface which is cylindrical, and which extends between upper ends of the flat surfaces.

4. The mixer as set forth in claim 3, wherein said isolator housing has a flat bottom surface which is bolted to the outer periphery of the mixer, and a plane being defined through a center of said bore in said isolator, with said plane being parallel to said flat bottom surface of said isolator, and an angle defined between said upper end of said flat surface and the plane, and said angle being between 46.00 and 47.00 degrees.

5. The mixer as set forth in claim 4, wherein said angle having an offset between 0.860 and 0.880 inches (2.18 and 2.24 centimeters).

6. The mixer as set forth in claim 4, wherein a first distance is defined as a length of said flat surface taken along a distance in a plane which is perpendicular to a center axis of said bore, and a radius defined from said center of said bore to said upper end of said flat surface, and a ratio of said first distance to said first radius being between 1.180 and 1.233.

7. The mixer as set forth in claim 6, wherein a second distance can be defined extending perpendicularly from said flat bottom surface to said center of said bore, and a ratio of said second distance to said angle being between 1.345/46.0 and 1.355/47.0 inches/degrees (3.41/46.0 and 3.44/47.0 centimeters/degrees).

8. The mixer as set forth in claim 7, wherein a ratio of said radius to said angle being between 0.860/46.0 and 0.880/47.0 inches/degrees (2.18/46.0 and 2.24/47.0 centimeters/degrees).

9. An air pack for use in an aircraft comprising:
    an air cycle machine including a fan, and a refrigerant system for conditioning air, the air cycle machine having an outlet communicating air toward a mixer housing, and said mixer housing having a port delivering air to a duct, said duct for supplying air into a passenger cabin of the aircraft;
    the mixer housing having an internal bore with an inlet to a chamber, and an outlet at an opposed end, and a duct to be connected to receive a recirculated air flow, said duct communicating air into the chamber through recirculating air ports such that the recirculating air can mix with the air from the inlet, and said mixer housing having a cockpit outlet for delivering air to a second outlet, with said cockpit output being located axially upstream from said recirculating air ports, an isolator mounted at an outer periphery of said mixer housing, and said isolator having flat sides on each of two circumferentially spaced sides of said isolator, and a belly band bolted to the outer periphery of said mixer housing, said belly band also being bolted to said flat sides of said isolator; and
    said isolator having a central bore receiving a vibration damper member.

10. The air pack as set forth in claim 9, wherein there being a plurality of posts in a row on each circumferential side of said isolator, and on the outer periphery of said mixer housing, and there being a reinforcing plate connected to each of said posts in each row on each of said circumferential side of said isolator.

11. The air pack as set forth in claim 10, wherein at least one of a duct and a valve is bolted to said posts on said side of said mixer.

12. The air pack as set forth in claim 9, wherein said isolator housing having an upper surface which is cylindrical, and which extends between circumferential outer ends of the flat surfaces.

13. The air pack as set forth in claim 12, wherein said isolator housing has a flat bottom surface which is bolted to the outer periphery of the mixer, and a plane being defined through a center of said bore in said isolator, with said plane being parallel to said flat bottom surface of said isolator, and an angle defined between said upper end of said flat surface and the plane, and said angle being between 46.00 and 47.00.

14. The air pack as set forth in claim 13, wherein said angle having an offset between 0.860 and 0.880 inches (2.18 and 2.24 centimeters).

15. The air pack as set forth in claim 13, wherein a first distance is defined as a length of said flat surface taken along a distance in a plane which is perpendicular to a center axis of said bore, and a radius defined from said center of said bore to said upper end of said flat surface, and a ratio of said first distance to said first radius being between 1.180 and 1.233.

16. The air pack as set forth in claim 15, wherein a second distance can be defined extending perpendicularly from said flat bottom surface to said center of said bore, and a ratio of said second distance to said angle being between 1.345/46.0 and 1.355/47.0inches/degrees (3.41/46.0 and 3.44/47.0 centimeters/degrees).

17. The air pack as set forth in claim 16, wherein a ratio of said radius to said angle being between 0.860/46.0 and 0.880/47.0 inches/degrees (2.18/46.0 and 2.24/47.0 centimeters/degrees).

* * * * *

UNITED STATES PATENT AND TRADEMARK OFFICE
CERTIFICATE OF CORRECTION

PATENT NO. : 9,511,869 B2
APPLICATION NO. : 13/723398
DATED : December 6, 2016
INVENTOR(S) : Pieter Van Lieu et al.

Page 1 of 2

It is certified that error appears in the above-identified patent and that said Letters Patent is hereby corrected as shown below:

In the Claims

In Claim 1, Column 3, Line 33; before "being located" replace "cockpit output" with --cockpit outlet--

In Claim 1, Column 3, Line 38; "an outer periphery" should read as --the outer periphery--

In Claim 3, Column 3, Line 50; before "an upper surface" replace "housing having" with --has--

In Claim 3, Column 3, Line 51; after "the flat" replace "surfaces" with --sides--

In Claim 4, Column 3, Line 53; before "has a" delete "housing"

In Claim 4, Column 3, Line 54; after "the mixer" insert --housing--

In Claim 4, Column 3, Line 57; after "said flat" replace "surface" with --side--

In Claim 6, Column 3, Line 64; after "said flat" replace "surface" with --side--

In Claim 6, Column 4, Line 1; after "said flat" replace "surface" with --side--

In Claim 6, Column 4, Line 2; after "first distance to" replace "said first radius" with --said radius--

In Claim 9, Column 4, Line 28; before "being located" replace "cockpit output" with --cockpit outlet--

In Claim 11, Column 4, Line 45; after "said posts on" replace "said side" with --sides--

In Claim 11, Column 4, Line 46; after "said mixer" insert --housing--

In Claim 12, Column 4, Line 48; before "an upper surface" replace "housing having" with --has--

Signed and Sealed this
Fourteenth Day of August, 2018

Andrei Iancu
*Director of the United States Patent and Trademark Office*

CERTIFICATE OF CORRECTION (continued)
U.S. Pat. No. 9,511,869 B2

In Claim 12, Column 4, Line 50; after "the flat" replace "surfaces" with --sides--

In Claim 13, Column 4, Line 52; before "has a" delete "housing"

In Claim 13, Column 4, Line 53; after "periphery of the mixer" insert --housing--

In Claim 13, Column 4, Line 56; after "defined between" replace "said" with --an--

In Claim 13, Column 4, Line 56; after "said flat" replace "surface" with --side--

In Claim 15, Column 4, Line 63; after "said flat" replace "surface" with --side--

In Claim 15, Column 5, Line 1; after "said flat" replace "surface" with --side--

In Claim 15, Column 5, Line 2; after "first distance to" replace "said first radius" with --said radius--

In Claim 16, Column 5, Line 8; before "(3.41/46.0" replace "1.355/47.0inches/degrees" with --1.355/47.0 inches/degrees--